Patented Oct. 10, 1950

2,524,833

UNITED STATES PATENT OFFICE 2,524,833

1,8-DICYANO-2,6-OCTADIENE AND PROCESS

William W. Prichard, Wilmington, and Gerald M. Whitman, New Castle, Del., assignors to E. I. du Pont de Nemours & Company, Wilmington, Del., a corporation of Delaware No Drawing. Application June 6, 1949, Serial No. 97,482

3 Claims. (Cl. 260—465.8)

This invention relates to a new unsaturated nitrile and to a method of preparing it.

Sebaconitrile is a very important intermediate in the preparation of various polyamides since it is the source of decamethylenediamine. At present, sebaconitrile is prepared from sebacic acid, itself obtained by alkaline pyrolysis of a castor oil acid soap. There has long been a need for a ten-carbon unsaturated dinitrile which could serve as starting material for the preparation of sebaconitrile, decamethylenediamine and sebacic acid. No such nitrile has heretofore been described nor were any methods available whereby such a compound could be prepared.

It is an object of this invention to provide a new unsaturated nitrile and a method for its preparation. A further object is to provide a new unsaturated nitrile which can serve as starting material for the preparation of sebaconitrile, decamethylenediamine and sebacic acid. A still further object is to provide a ten-carbon diene dinitrile and a novel method for its preparation. Other objects will appear hereinafter.

The objects of this invention are accomplished by the new ten-carbon diene dinitrile, 1,8-dicyano-2,6-octadiene, and the method for preparing it which comprises condensing two molecules of 1-chloro-4-cyano-2-butene by means of nickel carbonyl as the condensing agent.

The reaction is represented by the equation

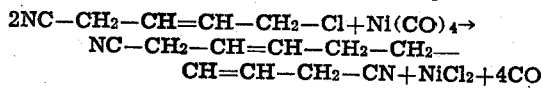

$$2NC-CH_2-CH=CH-CH_2-Cl + Ni(CO)_4 \rightarrow$$
$$NC-CH_2-CH=CH-CH_2-CH_2-$$
$$CH=CH-CH_2-CN + NiCl_2 + 4CO$$

The starting material, 1-chloro-4-cyano-2-butene, may be prepared in low yields by the method described in U. S. Patent 2,342,101. It is prepared in much better yields by the general procedure described in patent application Ser. No. 768,283, filed August 21, 1947, by G. M. Whitman, now Patent No. 2,477,674, issued August 2, 1949, for the preparation of 1,4-dicyano-2-butene. With suitable modifications of this general procedure (in particular, relatively low temperatures) at least part of the 1,4-dichloro-2-butene used is cyanated only half way. For purposes of illustration this modified procedure may be carried out as follows:

A stainless steel pressure vessel is charged with a mixture of 50 parts of 1,4-dichloro-2-butene, 85 parts of liquid hydrogen cyanide, 100 parts of calcium carbonate (acting as pH regulator) and 10 parts of cuprous bromide catalyst. The reaction mixture is heated at 75° C. under autogenous pressure for 12 hours, after which the vessel is washed out with benzene, the solid filtered off and extracted with benzene, and the combined benzene solutions are distilled. There is obtained 5 parts of unreacted 1,4 dichloro-2-butene, 16 parts of 1-chloro-4-cyano-2-butene, B. P. 44–46° C. at 0.3 mm. pressure, $n_D^{25}$ 1.4735, and 9 parts of 1,4-dicyano-2-butene, with intermediate fractions and still residue. The yield of 1-chloro-4-cyano-2-butene is 39% based on the unrecovered 1,4-dichloro-2-butene. This compound contains by analysis 11.40% of nitrogen and 31.86% of chlorine, as compared with the calculated values of 12.1% and 30.74%, respectively.

Another method of preparing this compound consists in treating a mixture of 1,4-dichloro-2-butene and acidified water containing a copper catalyst with an insufficient quantity of the cyanating agent, hydrogen cyanide or sodium cyanide, and under such conditions that the pH of the system is on the acid side throughout. (See U. S. patent application Ser. No. 745,236, filed May 1, 1947, by Webb and Tabet, now Patent No. 2,477,672, issued August 2, 1949.)

The other reactant, nickel carbonyl, may be prepared by known methods. It is a low-boiling liquid soluble in many organic solvents.

It should be noted that nickel carbonyl is a specific condensing agent for this reaction. Conventional condensing agents such as magnesium, zinc or sodium are ineffective in that no coupling reaction is observed when these agents are used.

This invention is illustrated in greater detail by the following example in which parts are by weight.

Example

A solution of 8 parts of 1-chloro-4-cyano-2-butene in 20 parts of methanol was warmed to 47° C. and treated gradually with a solution of 5.9 parts of nickel tetracarbonyl in 20 parts of methanol. Evolution of carbon monoxide began at once and the mixture became deep red. After the evolution of gas had ceased (1½ hours) the reaction mixture was cooled, whereupon it became light green. It was treated with 125 parts of water and the supernatant oily layer was separated. The water layer was extracted with benzene and the benzene extract was added to the organic layer and distilled. There was obtained 3 parts of unreacted 1-chloro-4-cyano-2-butene, and 3.2 parts of brownish crystals. This material, upon recrystallization from methanol, was obtained as yellow crystals melting at 44° C. It was 1,8-dicyano-2,6-octadiene, obtained in conversion of 57.5% and in yield, based on the unrecovered 1-chloro-4-cyano-2-butene of 92%.

Analysis: Calculated for $C_{10}H_{12}N_2$: C, 74.96; H, 7.50; N, 17.48. Found: C, 74.91; H, 7.62; N, 17.00.

The structure of the compound was further demonstrated by quantitative hydrogenation to sebaconitrile. This was carried out on a solution of the dinitrile in 95% ethanol at 20–25° C., using a palladium-on-charcoal catalyst. Hydrogen absorption corresponded to 0.0238 part of hydrogen per part of sample, as compared with the calculated value of 0.025 part of hydrogen per part of 1,8-dicyano-2,6-octadiene. The hydrogenation product was hydrolyzed by refluxing with aqueous hydrochloric acid to give a crystalline acid which was shown to be sebacic acid by melting point and mixed melting point with authenic sebacic acid (128–131° C. in both cases) and by its carbon content of 60.20% and hydrogen content of 9.09%, as compared with the calculated values of 59.39% and 8.97%, respectively.

The reactants are preferably used in equivalent quantities, that is, two moles of 1-chloro-4-cyano-2-butene per mole of nickel carbonyl, although an excess of one or the other does no harm. A solvent or diluent is not essential but it is preferable to use one to insure good contact between the reactants. The best solvents are the aliphatic alcohols of 1 to 4 carbon atoms since they dissolve both nickel carbonyl and the by-product, nickel chloride, but other inert diluents such as benzene, cyclohexane, di-n-butyl ether etc., can be used. The reaction mixture need not be completely anhydrous but it should not contain more than small amounts of water, e. g., less than 10% by weight of the total mixture.

The reaction temperature is not critical since the reaction is exothermic and proceeds at temperatures as low as −10° C. or even lower. In general, a reaction temperature between about 20 and 100° C. is preferred, although it can be as high as 150° C. or even higher. If desired, the reaction may be carried out under pressure in a closed vessel.

The progress of the reaction can be followed through the evolution of carbon monoxide. When this has ceased or substantially ceased, the reaction may be considered terminated. In general, the period required will be one to four hours at temperatures within 20 to 100° C. Of course, the reaction can be interrupted at any desired point before completion.

The resulting 1,8-dicyano-2,6-octadiene may be isolated from the reaction mixture directly by distillation or crystallization, or by dilution with water followed by solvent extraction.

In addition to its use in the synthesis of sebaconitrile, sebacic acid and decamethylenediamine, 1,8-dicyano-2,6-octadiene is useful as an intermediate in the preparation of many other chemicals in view of its four reactive groups, i. e., the two double bonds and the two cyano groups. It is also useful per se as an ingredient in insecticidal compositions.

As many apparently widely different embodiments of this invention may be made without departing from the spirit and scope thereof, it is to be understood that this invention is not limited to the specific embodiments thereof except as defined in the appended claims.

We claim:
1. The chemical compound, 1,8-dicyano-2,6-octadiene.
2. A process for preparing 1,8-dicyano-2,6-octadiene which comprises condensing 1-chloro-4-cyano-2-butene by means of nickel carbonyl as the condensing agent.
3. A process for preparing 1,8-dicyano-2,6-octadiene which comprises condensing in an inert diluent 1-chloro-4-cyano-2-butene by means of nickel carbonyl as the condensing agent.

WILLIAM W. PRICHARD.
GERALD M. WHITMAN.

REFERENCES CITED

The following references are of record in the file of this patent:

UNITED STATES PATENTS

| Number | Name | Date |
|---|---|---|
| 2,485,225 | Webb | Oct. 18, 1949 |